United States Patent Office 3,546,558
Patented Dec. 8, 1970

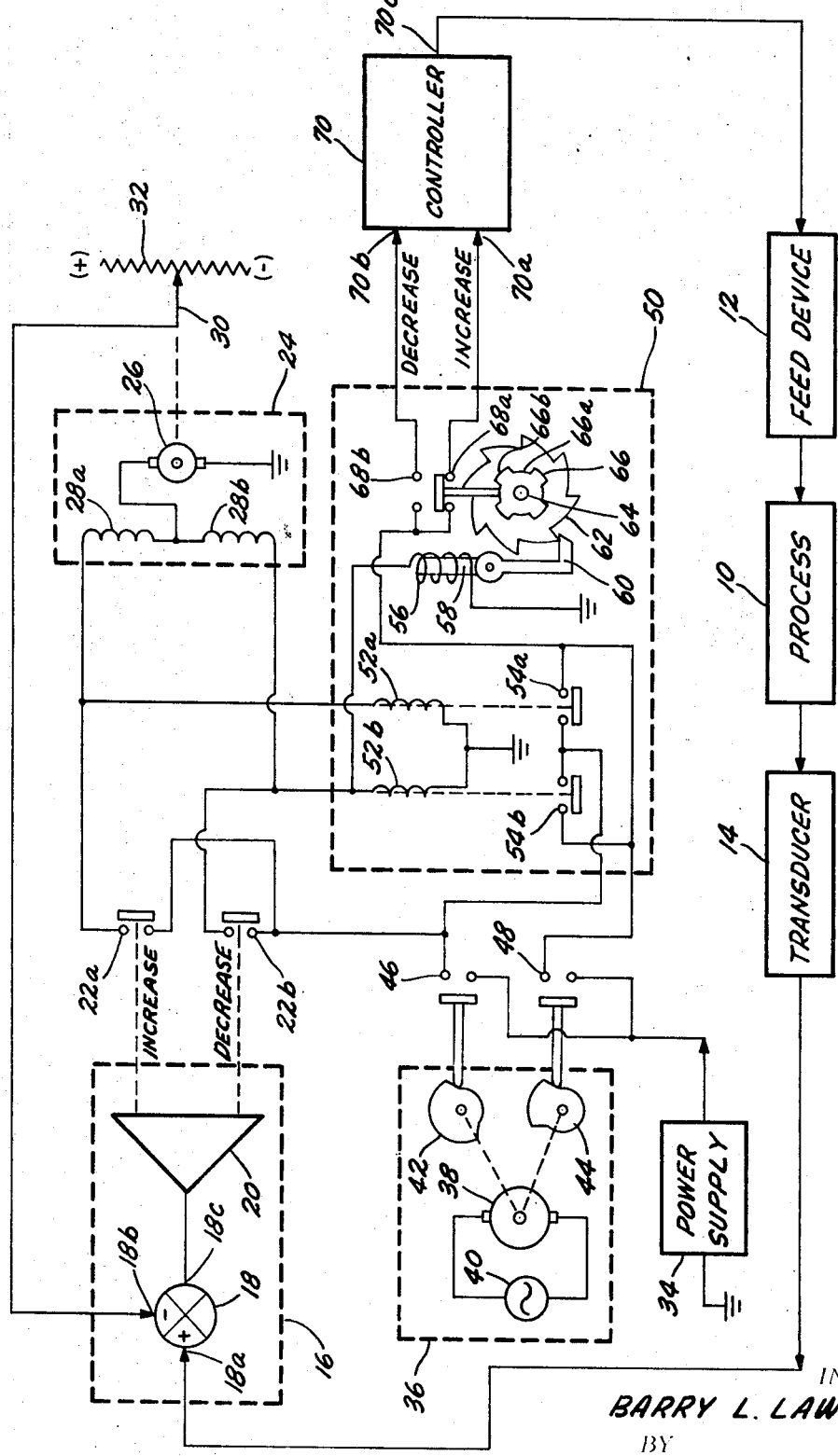

3,546,558
OPTIMISING APPARATUS
Barry L. Lawler, Johannesburg, Transvaal, Republic of South Africa, assignor to Ramsey Engineering Company, St. Paul, Minn., a corporation of Minnesota
Filed June 6, 1968, Ser. No. 734,948
Int. Cl. G05b 13/02
U.S. Cl. 318—561                             9 Claims

ABSTRACT OF THE DISCLOSURE

A first memory is adapted to store the value of a measured variable at a specific instant of time. A second memory is adapted to store information regarding the direction in which the last change was made to the input variable. A comparator compares the value of the measured variable at a specific instant of time with the value stored in the first memory. Means responsive to the output from the comparator and the value stored in the second memory adjusts the value of the input variable.

BACKGROUND OF THE INVENTION

Field of the invention

This invention relates generally to apparatus for controlling an input variable of a process, and pertains more particularly to apparatus for maximising or minimising a measured variable of the process so as to provide an optimum degree of control.

Description of the prior art

Optimising apparatus is well known, but such apparatus is quite complex and expensive. Frequently, prior art arrangements have involved the use of costly computers and associated circuitry.

SUMMARY OF THE INVENTION

It is an object of the present invention to provide relatively simple and inexpensive apparatus for optimising a given process.

Briefly, a first memory, when instructed, stores the value of the measured variable at that particular time. A second memory stores information pertaining to the direction in which the last or previous change was made to the input variable. Periodically, a programming timer calls for a comparison between the present value of the measured variable and that actually stored in the first memory. This information, together with that derived from the second memory, then produces a change in the input variable in a direction dependent upon the information furnished by the second memory and this change is further influenced by the magnitude of the output from the comparator. The first memory is then instructed to store the then present value of the measured variable for use in the next cycle.

BRIEF DESCRIPTION OF THE DRAWING

The sole figure selected for exemplifying my invention constitutes a block diagram with certain components schematically superimposed thereon.

DESCRIPTION OF THE PREFERRED EMBODIMENT

There are a number of processes in which some parameter or a plurality of parameters should be adjusted so as to derive an optimum operation of the process. In this regard, a parameter to be adjusted might be the temperature of a portion of the process, the volume of material entering the process or the energy utilized in the process. It will be understood that various disturbances can cause any number of parameters, depending largely upon the specific process, to fluctuate quite widely and therefore adversely affect the maximising or minimising of the measured variable of the particular process.

Since the specific process does not influence the practicing of my invention, the process itself has been illustrated only as a block carrying the reference numeral 10. If the process happens to be a grinding mill, the input variable could very well be the feed or volume of stock material to the mill or it could be the mill horsepower. At any rate, the block 12 labeled feed device is intended to be embracive of either the flow of material or energy entering or associated with the process 10. For the purpose of sensing the magnitude of the variable to be measured, a transducer 14 is depicted.

It is the transduced signal or measured variable from the transducer 14 that is fed to a comparator means 16, which includes a summing junction 18 having a pair of inputs 18a and 18b plus an output 18c. Since the difference or error signal sensed by the summing junction 18 is apt to be quite small, an amplifier 20 is employed in the comparator means 16 which controls either a first switch 22a or a second switch 22b. These switches are shown as normally open but if the difference in signals appearing at the summing junction is such that the stored value of the measured variable, as now represented by the voltage on input 18b, is not equal to the present value of the same variable, as represented by the voltage on input 18a, then one of these switches will be closed. The particular switch will be dependent on whether the present value exceeds or is less than the stored value. It will also depend on what choice is made in the application of invention, that is whether the measured variable is to be maximized or minimized.

What will be termed drive means 24 includes a motor 26 having windings 28a and 28b associated therewith, energization of the winding 28a causing the motor 26 to rotate in one direction and energization of the winding 28b causing a reverse rotation of the motor. It will be perceived that the winding 28a is connected in circuit with the switch 22a and winding 28b in circuit with the switch 22b. The motor 26 is mechanically coupled to a wiper arm 30 belonging to potentiometer 32. It is important at this time to appreciate that the potentiometer 32 functions as a first memory. In this regard, the wiper arm 30, while mechanically driven by the motor 26, is electrically connected to the input 18b of the summing junction 18. Any difference between the signal provided by the potentiometer 32 as determined by the position of the wiper arm 30 will be compared with the incoming measured variable signal provided by the transducer 14.

A power supply 34 furnishes electric power to the switches 22a, 22b and the motor 26 as well as other electrical components hereinafter referred to. However, the power actually furnished is controlled by a programming timer 36 which includes a motor 38 that is simply operated at a constant speed through an auxiliary power supply 40. The motor 38 drives a first timing cam 42 and a second timing cam 44. The cam 42 functions to close a normally open switch 46, whereas the cam 44 similarly operates a N.O. switch 48. At this time it should be explained that the cam 42 causes the switch 46 to close at one specific instant of time and the cam 44 causes the switch 48 to close at the same instant of time. On the other hand, the cams 42 and 44 are contoured or profiled so that the switch 46 is kept closed for a longer period of time than the switch 48.

A logic unit 50 constitutes a second memory and the details of the unit 50 will now be described. In this regard, there is a relay 52a and a relay 52b, the relay 52a being energized when the switch 22a is closed and the relay 52b being energized when the switch 22b is closed. The relay 52a has a set of normally open contacts 54a and the relay 52b similarly has a set of normally open contacts 54b. The role that these contacts 54a and 54b play will presently become manifest.

Continuing with the description of the logic unit 50, it will now be pointed out that there is included a bistable device which illustratively includes a solenoid coil 56 that is electrically connected to the switch 22b. An armature 58 is pulled upwardly when the coil 56 is energized. Pivotally carried by the armature 58 is a pawl 60 that is engaged with a ratchet 62. Each time that the coil 56 is energized, the pawl 60 causes the ratchet 62 to be rotatively advanced. The ratchet 62 is mounted on a shaft 64 that also carries a cam 66 having angularly spaced notches 66a the lobes 66b. A first switch 68a is closed when any one of the notches 66a is uppermost and the switch 68b is closed when any one of the lobes 66b is uppermost. It will soon become apparent that the particular position of the cam 66 will provide the requisite memory for the unit 50.

At this time attention is directed to the presence of an actuator or controller 70 having a pair of inputs 70a, 70b and an output 70c. It is the function of the controller 70 to supply a signal constituting desired value of the input variable to the process, the signal in the illustrative situation causing the feed device 12 to supply material to the process 10 at either a faster or slower rate depending upon the signal impressed on the inputs 70a and 70b. Since the controller 70 can be of conventional construction, it need not be described in detail. Briefly, though, it could very well constitute a motor which is driven in one direction when a signal is supplied via the input 70a and then in an opposite direction when a signal arrives via the input 70b, the motor in turn positioning a potentiometer. The arrangement can be quite similar to that shown in the drawing in the form of the motor 26 and the potentiometer 32, the voltage furnished by the potentiometer 32 being indicative of the corrective action that is required with respect to the operation of the feed device 12.

OPERATION

Having presented the foregoing information, the operation of my apparatus should be readily comprehended. However, a brief description of one complete cycle of operation should be of assistance in fully appreciating the benefits to be derived.

If it is assumed that the invention is being utilized to maximize the value of the measured variable, then when the contact 46 energizes the switches 22a and 22b, if there has been a decrease in measured variable since the previously cycle, only the switch 22b will be closed. This condition is indicative that the consequence of the action taken by the controller 70 on the previous cycle did not produce the desired result, namely a further increase of the measured variable. The resulting application of energy to the solenoid 56 now advances the shaft 64 and reverses the state of contacts 68a and 68b so as to instruct the controller 70 to change the desired value of the input variable in the opposite direction from that taken in the previous cycle.

Assuming that the measured variable provided by the transducer 14 has decreased, the signal now applied to the input 18a of the summing junction 18 will not be equal to the signal supplied from the wiper arm 30 of the potentiometer 32 which is impressed on the input 18b. This difference will cause an error signal to appear at the output 18c which is amplified by the amplifier 20. This causes the switch 22b to become closed.

Closing of the switch 22b is ineffectual unless the time-control switch 46 is also closed. Of course, the switch 46 is under the influence of the program timer 36. When closed, the switch 46 allows power to flow from the supply 34 to the switch 22b. This results in an energization of the winding 28b with the consequence that the motor 26 operates in a direction to change the position of the wiper arm 30 and cause the difference in the value of the stored information in the potentiometer 32 to be changed so as to reduce the difference between this value which is applied to the input 18b and the value of the measured variable which is supplied at input 18a.

Concomitantly with the closing of the contacts 22b is an energization of the coil 56 which causes the armature 58 to lift up the pawl 60 and advance the ratchet 62 so that a lobe 66b is now uppermost. This causes the switch 68b to close so that power can be delivered to the input 70b of the controller 70 through the switch 68b.

With the switch 46 and the switch 22b both closed, the relay 52b becomes energized to close its contacts 54b. This provides a direct connection between the switch 46 and the switch 68b. However, the switch 48 is under the direct influence of the program timer 36. We have assumed that the switch 48 will close simultaneously with the switch 46. By this arrangement, there is an electrical path from the power supply 34 through the switch 48 to the switch 68b. Hence, there are two paths over which power may flow to cause a decrease signal to be applied to the controller 70 through the agency of its input 70b. The controller 70, under these circumstances, immediately changes the value of the input variable delivered to the feed device 12. Since we have described the circuit condition for a decrease, the feed device 12 will operate at a slower rate so as to feed less material to the process 10. Since the switch 48 remains closed for a shorter period of time than the switch 46, opening of the switch 48 will remove one electrical path via which the decrease in the value of the input variable can be realized. If the switch 22b is still closed, then the other path remains and the controller continues to make an adjustment in the value of the input variable through the feed device 12. The power supply may be readily traced from the switch 46 through the closed contacts 54b and through the closed switch 68b to the input 70b of the controller.

Of course, the switch 22b remains closed only as long as an error signal appears at the output 18c of the summing junction 18. If the corrective action that takes place results in the switch 22b opening before the time-controlled switch 48, the time-controlled switch 46 still being closed, then the circuit to the controller 70 through the contacts 54b will be interrupted; however, a definite increment of change will have occurred under this set of conditions because the contacts 48 are always held closed for a predetermined period of time. It is only when the error between the value of the stored information represented by the position of the wiper arm 30 of the potentiometer 32 is sufficient to require a time of operation of motor 26 longer than the closed duration of switch 48 that the action of the switch 22b predominates.

An error at the summing junction 18 should not be allowed to remain after the switch 46 opens, since the stored value of the measured variable would then not be correct. To insure against this event, the speed of the motor 26 and the closed duration of switch 46 must be chosen appropriately.

It is implicit that the change in the measured variable will not occur simultaneously with the change made by controller 70 to the input variable; however, the time difference is related to the cyclic rate of the timer 36. The choice of this cyclic rate must be related to the response time of the process 10, but the interval between successive cycles should be made sufficiently long to insure that the change of measured variable is significant and not merely the result of random perturbations. Under certain circumstances it will be necessary to filter the random fluctuations in output of transducer 14 to achieve a compromise value for the cycle duration.

Although the preceding operational description illustrated only one of the two options possible each cycle, it will be understood that the function of the second memory 50 is to cause a repetition of the action taken in adjusting the value of the input variable during the immediately preceding cycle when the result of such action was an increase in the value of the measured variable. To this end, the ratchet 62 and pawl 60 are only activated when the change in the measured variable is discerned to be a decrease. Were the invention to be applied for minimizing the value of the measured variable, the second memory 50 would instead be changed only when an increase is discerned; the solenoid coil 56 would then be activated by switch 22a.

I claim:

1. Optimising apparatus for controlling an input variable of a process so as to maximize or minimize a measured variable of the process including a first memory adapted to store the value of the measured variable at a specific instant of time, a second memory adapted to store information regarding the direction in which the last change was made to the input variable, a comparator to compare the value of the measured variable at a specific instant of time with the value stored in the first memory, and means responsive to the output from the comparator and the directional information stored in the second memory to adjust the value of the input variable.

2. Optimising apparatus as claimed in claim 1 in which the first memory comprises a motorized potentiometer.

3. Optimising apparatus controlling an input variable of a process so as to maximize or minimize a measured variable of the process including first memory means for storing information representative of the value of the measured variable at a given time, second memory means for storing information representative of the direction in which the input variable was last changed, comparator means for comparing the value of the measured variable with the value of information stored in said first memory means, and means responsive to the output from said comparator means and directional information stored in said second memory means for adjusting the value of the input variable.

4. Optimising apparatus as claimed in claim 3 in which said second memory means includes a bistable device controlled by said comparator means, the state of said bistable device determining whether said input variable is to be increased or decreased.

5. Optimising apparatus as claimed in claim 4 in which said bistable device includes a pair of switches, closure of one of said switches indicating one state of said device and closure of the other of said switches indicating the other state of said device, and means connected to said pair of switches for supplying power for a predetermined period of time through whichever switch is closed to change the value of said input variable by a predetermined increment in the direction determined by the particular switch that is closed.

6. Optimising apparatus as claimed in claim 5 including means for controlling said responsive means for a period of time longer than said predetermined period of time to continue the adjustment of the value of said input variable for an additional interval of time when there continues to be an output of sufficient value from said comparator means.

7. Optimising apparatus for controlling an input variable of a process so as to maximize or minimize a measured variable of the process including means for adjusting said input variable to increase or decrease the value thereof, means for providing said measured variable, first memory means for storing information representative of the value of the measured value at a given time, comparator means for comparing the value of the measured variable with the value of information stored in said first memory means, first switch means controlled by said comparator means for adjusting the value of information stored in said first memory means in a direction determined by the output from said comparator means, first time-controlled switch means in circuit with said first switch means for supplying power to said first switch means for successive predetermined periods of time, second memory means controlled by said first switch means including bistable switch means in circuit with said controller for actuating said controller to change the value of the input variable in a direction determined by the position of said bistable switch means, said second memory means comprising means controlled by said first switch means to position said bistable switch means so as to store information representative of the direction in which the input variable was last changed and said second memory means further comprising additional switch means in circuit with said bistable means and said controller in accordance with said first switch means, and second time-controlled switch means in circuit with said additional switch means for supplying power through said additional switch means and said bistable switch means to said controller for successive predetermined periods of time shorter than the predetermined periods of time provided by said first time-controlled switch means.

8. Optimising apparatus as claimed in claim 7 in which said first switch means comprises a pair of switches, one of which is closed when there should be an increase in the value of the measured variable and the other of which is closed when there should be a decrease in the value of the measured variable, and said bistable switch positioning means being actuated when a particular one of said pair of switches is closed.

9. Optimising apparatus as claimed in claim 8 in which said additional switch means comprises a pair of switches, means energized by the closure of one of said first pair of switches for causing one of said additional pair of switches to close, and means energized by the closure of the other of said first pair of switches for causing the other of said additional pair of switches to close, whereby the closing of either of said additional pair of switches will supply power to said controller in accordance with the position of said bistable switch means for successive periods of time no longer than the predetermined periods of time provided by said first time-controlled switch means but for longer periods of time than those provided by said second time-controlled switch means when either of the first pair of switches remains closed.

References Cited

UNITED STATES PATENTS

| | | | |
|---|---|---|---|
| 2,508,162 | 5/1950 | Herwald | 318—29 |
| 2,904,734 | 9/1959 | Paschkis | 318—28 |
| 3,286,144 | 11/1966 | Hill | 318—448X |

BENJAMIN DOBECK, Primary Examiner

U.S. Cl. X.R.

318—672